US010967718B2

(12) United States Patent
Prodoni et al.

(10) Patent No.: US 10,967,718 B2
(45) Date of Patent: Apr. 6, 2021

(54) TRIMMING AND SEALING ASSEMBLY FOR AN EDGE OF A WINDOW OF A MOTOR VEHICLE

(71) Applicant: COOPER-STANDARD AUTOMOTIVE ITALY S.p.A. A SOCIO UNICO, CIRIE' (IT)

(72) Inventors: Fabio Prodoni, Ala di Stura (IT); Stefano Zampa, San Francesco al Campo (IT)

(73) Assignee: COOPER-STANDARD AUTOMOTIVE ITALY S.P.A. A SOCIO UNICO

( * ) Notice: Subject to any disclaimer, the term of this patent is extended or adjusted under 35 U.S.C. 154(b) by 119 days.

(21) Appl. No.: 16/329,524

(22) PCT Filed: Sep. 4, 2017

(86) PCT No.: PCT/IB2017/055299
§ 371 (c)(1),
(2) Date: Feb. 28, 2019

(87) PCT Pub. No.: WO2018/042394
PCT Pub. Date: Mar. 8, 2018

(65) Prior Publication Data
US 2019/0193542 A1 Jun. 27, 2019

(30) Foreign Application Priority Data
Sep. 2, 2016 (IT) .......................... 102016000089226

(51) Int. Cl.
*E06B 7/16* (2006.01)
*B60J 10/88* (2016.01)
(Continued)

(52) U.S. Cl.
CPC ............. *B60J 10/88* (2016.02); *B60J 10/265* (2016.02); *B60J 10/27* (2016.02); *B60J 10/36* (2016.02); *B60J 10/76* (2016.02)

(58) Field of Classification Search
CPC . B60J 10/88; B60J 10/265; B60J 10/27; B60J 10/76; B60J 10/36
(Continued)

(56) References Cited

U.S. PATENT DOCUMENTS

| 5,038,521 A * | 8/1991 | Andrzejewski | ........ B60J 10/248 |
| | | | 428/122 |
| 7,410,203 B2 * | 8/2008 | Yatsuda | ................... B60J 10/30 |
| | | | 296/146.1 |

(Continued)

FOREIGN PATENT DOCUMENTS

| DE | 15 30 738 | 5/1969 |
| DE | 30 33 389 | 3/1982 |

(Continued)

OTHER PUBLICATIONS

Written Opinion of the International Searching Authority, European Patent Office, dated Dec. 22, 2017.
(Continued)

*Primary Examiner* — Jerry E Redman
(74) *Attorney, Agent, or Firm* — Valauskas Corder LLC

(57) ABSTRACT

Trimming and sealing assembly for an upper portion of a window frame of a motor vehicle door, the upper portion having a support flange having a sheet metal member having an upper wing and a rear lateral wing. The assembly has a bearing profile having an upper wing extending above the upper wing of the support flange and a front lateral wing. A downwardly-open seat is formed between the support flange and the bearing profile. An external trimming profile is connected to the front lateral wing of the bearing profile. A (Continued)

sealing strip, mounted in the downwardly-open seat, has first and second lateral branches, respectively adjacent to the front lateral wing of the bearing profile and to the rear lateral wing of the support flange, and provided longitudinal sealing lips. An upper space of the bearing profile is adjacent to the downwardly-open seat.

2 Claims, 5 Drawing Sheets

(51) Int. Cl.
  *B60J 10/36* (2016.01)
  *B60J 10/265* (2016.01)
  *B60J 10/27* (2016.01)
  *B60J 10/76* (2016.01)

(58) Field of Classification Search
  USPC .................................................. 49/441, 495.1
  See application file for complete search history.

(56) References Cited

U.S. PATENT DOCUMENTS

| | | | | |
|---|---|---|---|---|
| 8,789,313 | B2* | 7/2014 | Roll | B60J 10/75 49/377 |
| 9,027,284 | B2* | 5/2015 | Murree | B60J 10/265 49/495.1 |
| 2009/0223135 | A1* | 9/2009 | Bocutto | B60J 10/235 49/493.1 |
| 2011/0099911 | A1* | 5/2011 | Ellis | B60J 5/0402 49/493.1 |
| 2013/0277516 | A1 | 10/2013 | Patterson | |
| 2013/0305612 | A1 | 11/2013 | Murree | |

FOREIGN PATENT DOCUMENTS

| | | |
|---|---|---|
| DE | 43 09 088 | 9/1994 |
| DE | 199 22 749 | 11/2000 |
| DE | 10 2006 021190 | 11/2007 |
| DE | 10 2011 014540 | 9/2012 |
| EP | 2 353 909 | 8/2011 |
| EP | 2 594 421 | 5/2013 |

OTHER PUBLICATIONS

International Search Report, PCT/IB2017/055299, European Patent Office, dated Dec. 22, 2017.

* cited by examiner

TRIMMING AND SEALING ASSEMBLY FOR AN EDGE OF A WINDOW OF A MOTOR VEHICLE

CROSS-REFERENCE TO RELATED APPLICATIONS

This application is a National Phase Application of PCT International Application No. PCT/IB2017/055299 having an International Filing Date of Sep. 4, 2017, claiming priority to Italian Patent Application No. 102016000089226, filed Sep. 2, 2016, each of which is hereby incorporated by reference in its entirety.

FIELD OF THE INVENTION

The present invention generally relates to the sector of trimming and sealing strips for motor vehicles.

In particular, the invention relates to a trimming and sealing assembly for a top portion of a window frame of a motor vehicle door to which a transparent pane, typically made of glass or the like, is associated, movable between a lowered opening position and a raised closing position.

SUMMARY OF THE INVENTION

An object of the present invention is to propose a new trimming and sealing assembly having improved features.

This and other objects are accomplished according to the present invention with a trimming and sealing assembly of the type specified above, wherein
  said upper portion of the frame of the window comprises at least one longitudinal support flange including a sheet metal member having a substantially L-shaped cross-section, with an upper wing forming an angle with respect to said pane and provided with coupling means and with a rear lateral wing turned towards the inside of the motor vehicle extending at least in part downwards;
  the trimming and sealing assembly comprising
  a rigid bearing profile, also having an L-shaped cross-section, with an upper wing extending above the upper wing of said support flange and provided with coupling means and a front lateral wing turned towards the environment outside the motor vehicle and facing the rear lateral wing of said support flange, such that between said flange and the bearing profile there is defined a downwardly-open seat;
  an external trimming profile being connected to the front wing of the bearing profile;
  in said seat there being mounted a sealing strip having an essentially inverted U-shaped cross-section, with first and second lateral branches which are adjacent to the front wing of the bearing profile and, respectively, to the rear wing of the support flange and provided with respective longitudinal sealing lips adapted to contact the opposite surfaces or faces of said transparent pane when the latter is in said closed position;
  in the bearing profile there being defined an upper longitudinal space, adjacent to said seat, into which space said support flange extends; and
  a plurality of anchoring clips having a substantially C- or U-shaped cross-section, provided in longitudinally spaced positions in the upper space of the bearing profile and held therein by the aforementioned coupling means;
  each anchoring clip having an upper branch and a lower branch opposite one another and resiliently divaricable and between which the upper wing of said support flange is fitted with interference and snap-engaged by means of the aforementioned coupling means.

BRIEF DESCRIPTION OF THE FIGURES

Further features and advantages of the invention will become apparent from the detailed description that follows, provided purely by way of non-limiting example with reference to the accompanying drawings, wherein.

DETAILED DESCRIPTION

Figure 1:
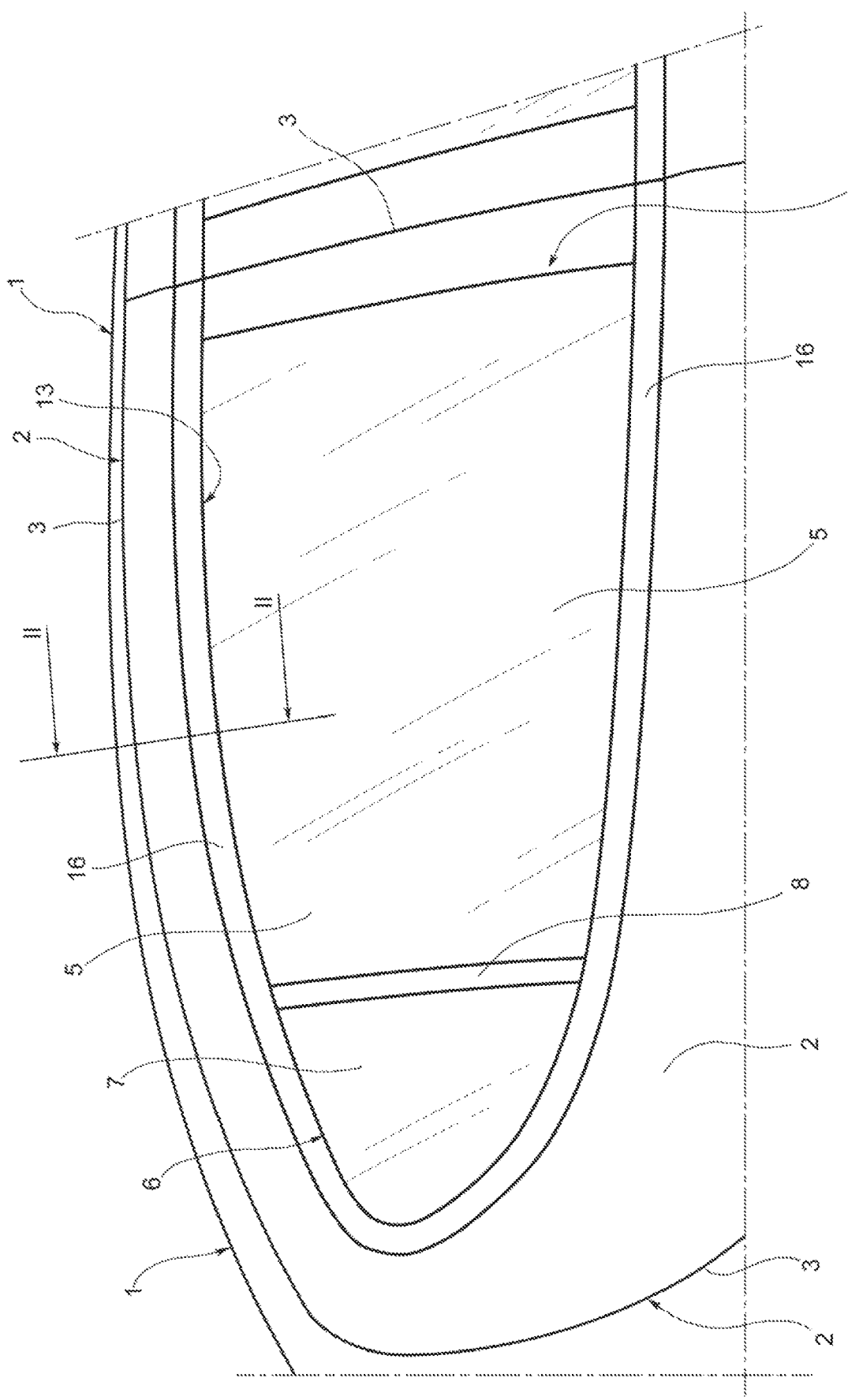
FIG. 1 is a partial side view of the body of a motor vehicle having a side door with a window, wherein the upper portion of the window frame is provided with a trimming and sealing assembly according to the present invention.

In FIG. 1, the body of a motor vehicle, such as a four-door type car (two per side), is collectively indicated at 1.

In FIG. 1, the upper part of a rear door 2, associated with a corresponding opening 3 of the body of the motor vehicle 1, is visible.

Figure 2:
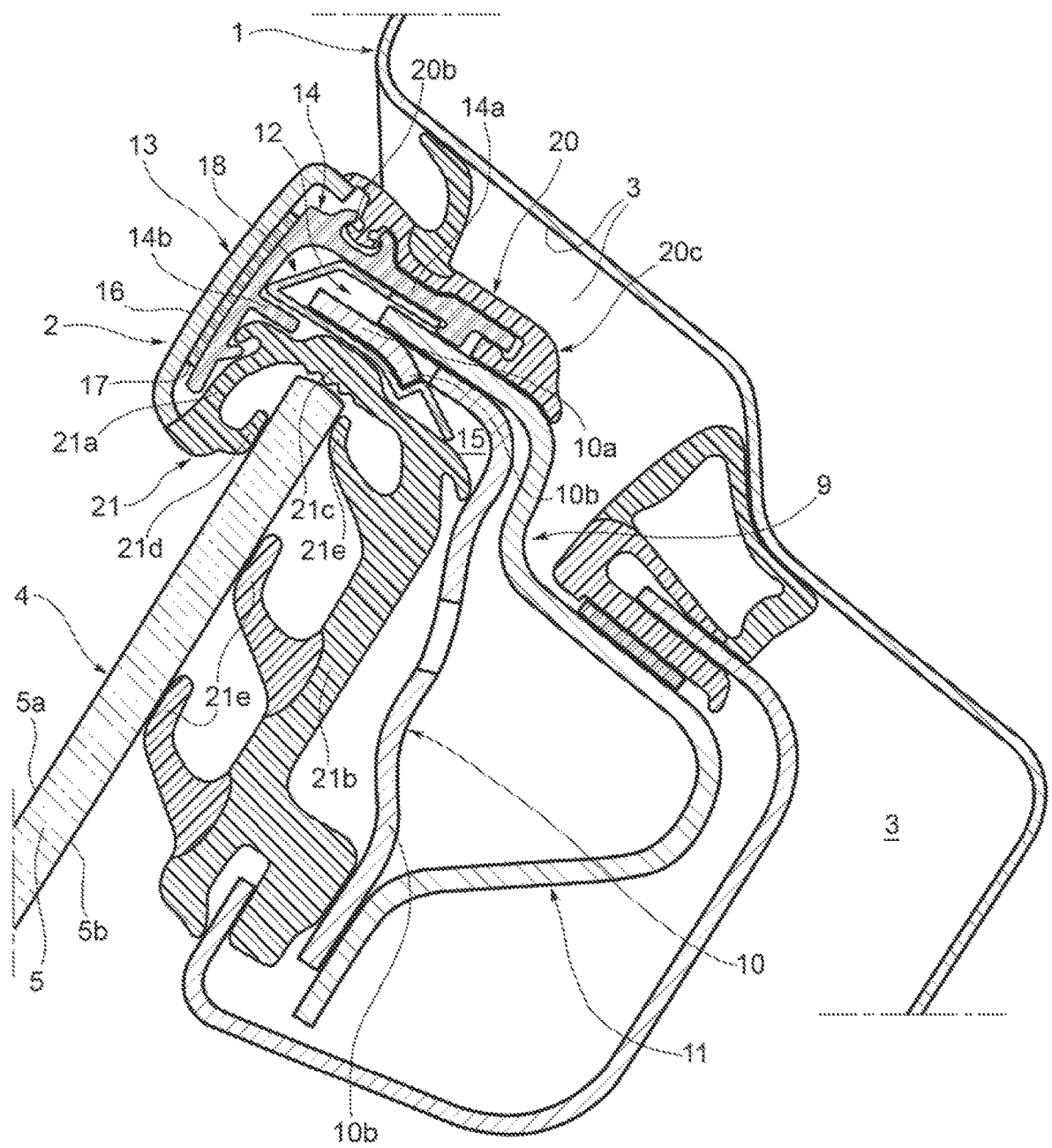
FIG. 2 is a partial sectional view along the line II-II of FIG. 1.
Figure 3:
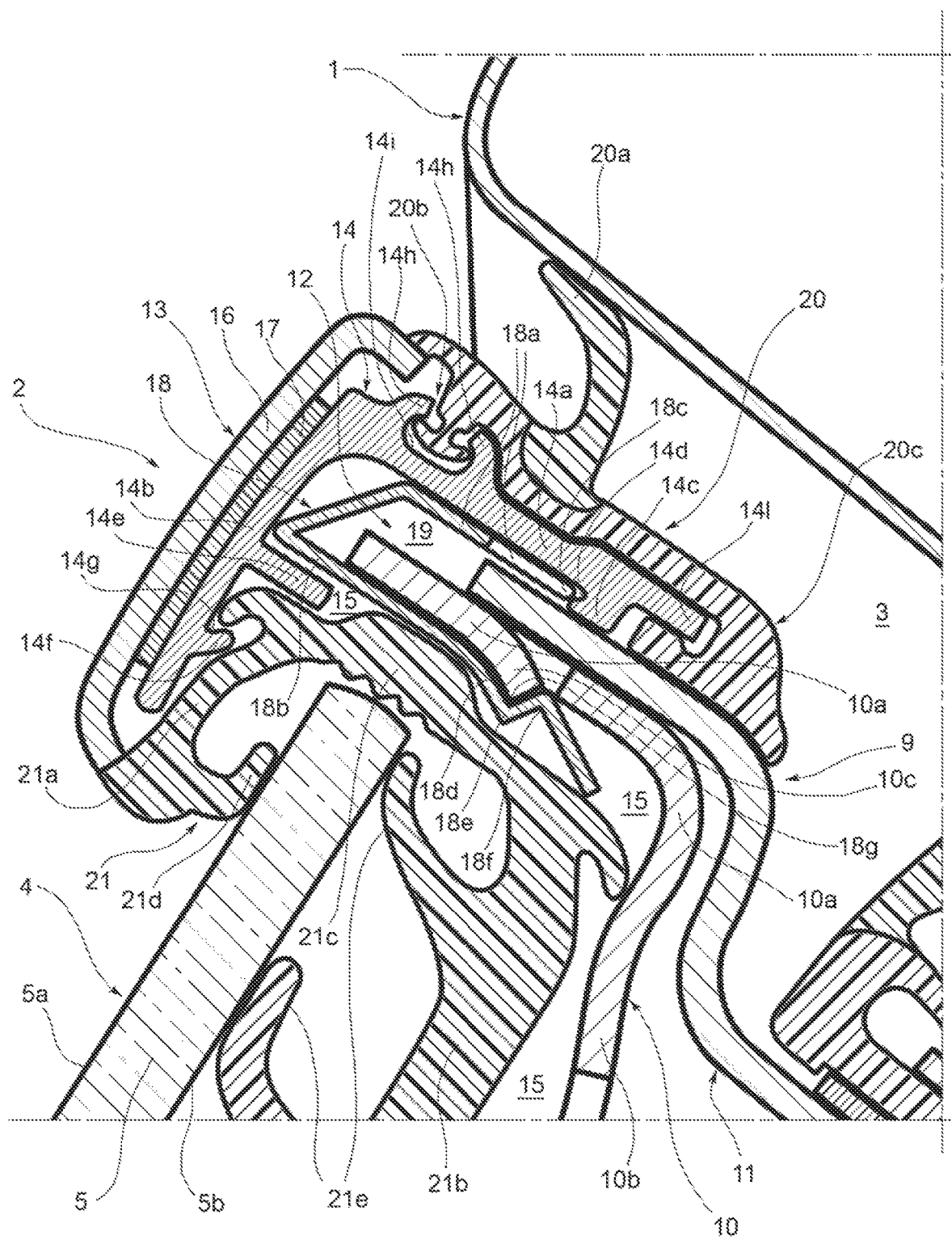
FIG. 3 is a view showing in enlarged scale part of FIG. 2.

The door 2 includes a window 4 to which is associated a transparent pane 5, for example made of glass or the like, movable in a guided manner between a lowered opening position (not shown in the drawings) and a raised closing position (shown in FIGS. 1 to 3).

In the embodiment illustrated by way of example, the window 4 further comprises a rear portion 6 (FIG. 1), of a small size, including a fixed mounted transparent pane 7.

Between the pane 7 of the fixed window portion 6 and the movable pane 5, a fixed upright 8 extends also as a guide for the movable pane 5.

Referring to FIG. 2, the window 4 comprises a top frame portion 9 including a pair of metal sheet members 10 and 11, shaped and welded to each other.

In the upper part of the frame portion 9, the sheet metal members 10 and 11 have respective flattened edges, which collectively form a support flange 12, whereon a trimming and sealing assembly is mounted, collectively indicated at 13 (see also FIG. 3).

The sheet metal member 10 has a substantially L-shaped cross-section and comprises an upper wing 10a extending into a plane forming an angle with respect to the movement plane of the transparent pane 5. In such wing or flap 10a, a plurality of retaining formations 10c are arranged, by means of shearing and folding operations, in the form of downwardly protruding tabs, longitudinally spaced, of which only one is visible in FIGS. 2 and 3.

The sheet metal member 10 further comprises a rear lateral wing 10b extending downwards and which in the illustrated embodiment is welded to a corresponding lower wing or flap of the sheet metal member 11 (FIG. 2).

The trimming and sealing assembly 13 comprises a rigid bearing profile 14, made, for example, of aluminum or an alloy thereof. Such bearing profile 14 also has a cross section having essentially an inverted L shape.

The bearing profile 14 has in particular an upper wing 14a extending above the wing 10a of the sheet metal member 10 of the support flange 12 and a front lateral wing 14h turned towards the environment outside the motor vehicle 1.

Such front wing 14b faces, in spaced relation, the rear wing 10b of the sheet metal member 10, so that between the flange 12 and in particular the sheet metal member 10 and the bearing profile 14 is defined a seat 15, opening downwards (see in particular FIG. 3).

In the illustrated embodiment, the wing or flap 14a of the bearing profile 14 has a longitudinal rib 14c protruding downward defining a recess 14d (FIG. 3) facing the wing or flap 14b.

The wing or flap 14b of the bearing profile 14 on its downwardly turned face has a longitudinal rib 14e (FIGS. 3 and 4) and, at its distal end, a further rib 14f which, from the side facing the other wing or flap 14a, defines a recess 14g (FIG. 3).

Referring to FIG. 3, the upper wing or flap 14a of the bearing profile 14 has on its upper face a pair of longitudinal ribs 14h, between which an opening 14i in the form of a channel is defined.

The ribs 14h are curved, one toward the other, so that the channel opening 14i is narrowed.

Figure 5:
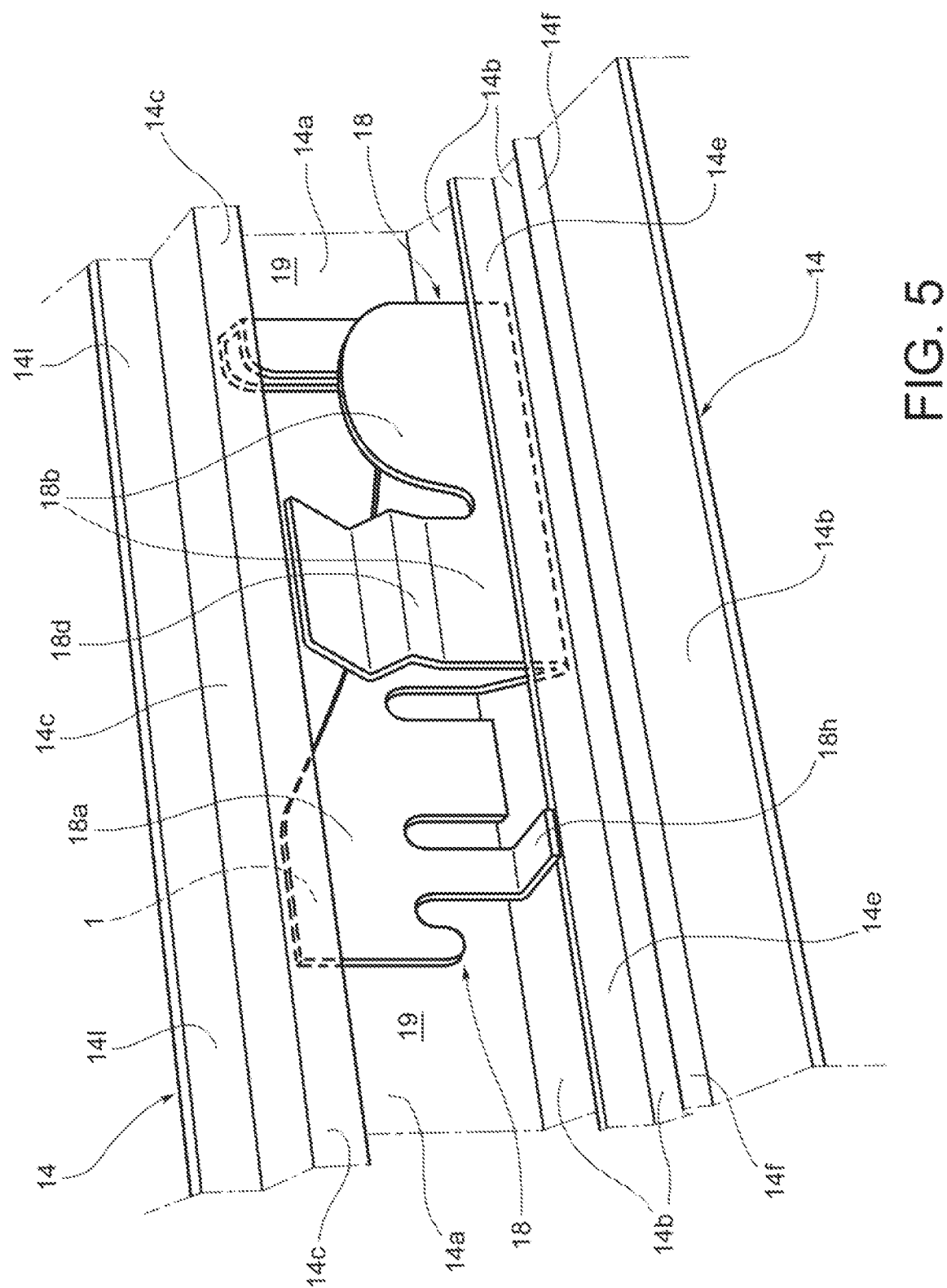
FIG. 5 is a partial perspective view showing a clip according to FIG. 4 in the mounted condition in a bearing profile in the solution according to the present invention.

The wing or flap 14a of the profile 14 has an end tab, indicated by 141 in FIGS. 3 and 5.

An external trimming profile 16 is connected to the outer face of the front wing 14b of the bearing profile 14 (see in particular FIGS. 2 and 3). The trimming profile 16 may be made of plastic or metallic material and its outer surface may be, for example, chromed.

Appropriately, the anchoring of the trimming profile 16 to the bearing profile 14 may be achieved with a double-sided adhesive tape 17.

The bearing profile 14 is anchored to the flange 12 of the window frame 4 by means of a plurality of clips 18 (FIGS. 2 to 5), made, for example, of a metallic material such as spring steel.

As can be seen in FIGS. 3 and 5, the anchoring clips 18 are mounted longitudinally in a longitudinal upper space 19 defined between the wing or flap 14a, the upper portion of the wing or flap 14b and the ribs 14c and 14e of the bearing profile 14.

Figure 4:
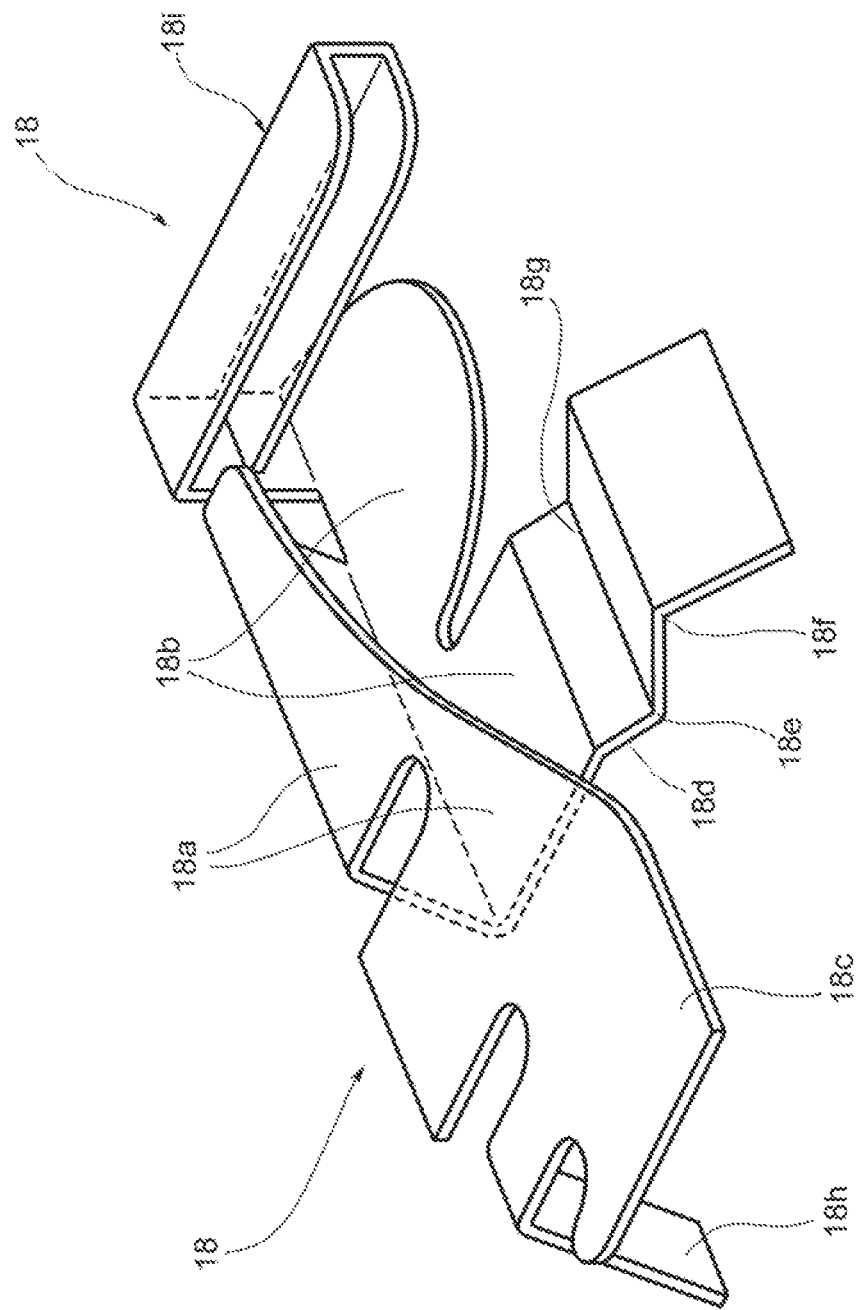
FIG. 4 is a perspective view of an anchoring clip comprised in a trimming and sealing assembly according to the present invention.

As seen in particular in FIGS. 2 and 3, each anchoring clip 18 has an essentially C-shaped cross-section with an upper branch 18a and a lower branch 18b, opposite one another and resiliently divaricable (see also FIGS. 4 and 5).

With reference to FIGS. 3 and 5, the upper branch 18a of each anchoring clip 18 has the distal end 18c engaged in the recess 14d defined by the rib 14c of the bearing profile 14.

The branch 18b of each anchoring clip 18 has the distal end 18d (FIGS. 3 and 4) curved downwards and then folded upwards in 18e and then folded downwards in 18f. As can be seen in FIG. 3, the distal portion 18d of the branch 18b of each anchoring clip 18 thus forms a recess 18g, the profile of which is substantially complementary to part of the profile of the protruding appendage 10c of the sheet metal member 10 of the flange support 12.

Appropriately, anchoring clips 18 are pre-positioned in the upper space 19 defined in the bearing profile 14 before it is coupled to the window opening support flange 12. The anchoring profile 14, provided with anchoring clips 18, may then be applied to the support flange 12 so that the projecting appendages 10c of the latter cause a divarication of two branches 18a, 18b of such clips 18, until such appendages 10c are snap-coupled with the recesses 18g of said clips 18, as is particularly apparent in FIG. 3.

With reference to FIG. 4, each anchoring clip 18 may appropriately be provided with a spring tab 18h extending from the proximal portion of the branch 18a and which, in the mounted condition, presses in a resiliently loaded condition against the rib 14e of the bearing profile 14, as seen in FIG. 5, in order to stabilize the position of the clip 18.

On the opposite side, each anchoring clip 18 may appropriately present a folded stiffening tab, as collectively indicated at 18i in FIG. 4.

Appropriately, a sealing strip 20 (FIGS. 2 and 3) is pre-mounted on the bearing profile 14, having superiorly a longitudinal spring lip 20a, which in the closed condition of the door 2 presses against the edge of the opening 3 of the body of the motor vehicle 1, to avoid the onset of aerodynamic humming and/or hissing.

In the illustrated embodiment, the seal 20 comprises an anchoring profile 20h with a substantially T-shaped cross-section, the spring wings of which are able to engage below the outward edges of the ribs 14h of the bearing profile 14.

The sealing strip 20 further comprises an anchoring profile 20c with an essentially C-shaped cross-section, engaging around the tab 141 of the bearing profile 14 (see in particular FIG. 3).

The upper seal 20 is also appropriately pre-mounted on the bearing profile 14 before the profile, provided with anchoring brackets 18, is coupled to the support flange 12.

Referring again to FIGS. 2 and 3, a sealing strip 21 having a substantially inverted U-shaped cross-section is mounted in the seat 15 defined between the bearing profile 14 and the sheet metal member 10.

Such sealing strip 21 has two lateral facing branches 21a and 21b, the first of which is adjacent to the front wing 14h of the bearing profile 14 and the other is adjacent to the rear wing 10b of the sheet metal member 10 of the flange 12.

Said lateral branches 21a and 22b of the sealing strip 21 are interconnected by an intermediate part 21c, adjacent to the lower branch 18b of the anchoring clips 18. Said lateral branches 21a and 21b are provided with respective longitudinal sealing lips 21d and 21e, which, when the transparent pane 5 is in its closing position (FIGS. 2 and 3), press against the opposite surfaces or faces 5a and 5b of such pane.

The trimming and sealing assembly 13 according to the invention described above is relatively simple and easy to implement.

Naturally, without altering the principle of the invention, the embodiments and the details of implementation may vary widely with respect to those described and illustrated purely by way of non-limiting example, without thereby departing from the scope of the invention as defined in the appended claims.

The invention claimed is:

1. A trimming and sealing assembly for an upper portion of a frame of a window in a door of a motor vehicle, the window having a transparent pane, movable between a lowered opening position and a raised closing position,
   said upper portion of the frame of the window including
   at least one longitudinal support flange, including a
   sheet metal member having an L shaped cross-section,
   the sheet metal member comprising an upper wing
   forming an angle with respect to said transparent pane
   and provided with coupling means in the form of
   longitudinally spaced and downwardly protruding tabs, and a rear lateral wing or flap turned towards an inside of the motor vehicle and extending at least in part downwards; wherein the trimming and sealing assembly comprises:

a rigid bearing profile having an L-shaped cross-section, the rigid bearing profile comprising an upper wing extending above the upper wing of said longitudinal support flange and a front lateral wing turned, in use, towards an environment outside the motor vehicle and facing the rear lateral wing of said longitudinal support flange, such that between the longitudinal support flange and the rigid bearing profile a downwardly-open seat is formed;

an external trimming profile connected to the front lateral wing of the rigid bearing profile;

a sealing strip mounted in the downwardly-open seat and having an inverted U-shaped cross-section, the sealing strip comprising first and second lateral branches respectively adjacent the front lateral wing of the rigid bearing profile and to the rear lateral wing of the longitudinal support flange, and provided with respective longitudinal sealing lips adapted to contact opposite surfaces or faces of said transparent pane when the transparent pane is in said raised closing position;

an upper longitudinal space formed in the rigid bearing profile and extending adjacent said downwardly-open seat, said support flange extending in said upper longitudinal space; and a plurality of anchoring clips having C- or U-shaped cross-section, predisposed in longitudinally-spaced positions in the upper longitudinal space of the rigid bearing profile and retained therein by said coupling means, each anchoring clip of said plurality of anchoring clips having an upper branch and a lower branch, opposite one another and resiliently divaricated, said longitudinal support flange being fitted with interference and snap-engaged between said upper branch and said lower branch.

2. The trimming and sealing assembly of claim 1, wherein said upper wing of the rigid bearing profile has on an upper face a pair of longitudinal ribs, an opening in the form of a channel being formed between said pair of longitudinal ribs, the trimming and sealing assembly further comprising a sealing strip pre-mounted on the rigid bearing profile, said sealing strip comprising, superiorly, a longitudinal spring lip, which, in a closed condition of the door, presses against an edge of an opening of the body of the motor vehicle to avoid onset of aerodynamic humming and/or hissing, said sealing strip-further comprising an anchoring profile with a T-shaped cross-section, spring wings of the anchoring profile engaging below outward edges of the longitudinal ribs of the rigid bearing profile.

* * * * *